(12) United States Patent
Preti et al.

(10) Patent No.: US 8,002,106 B2
(45) Date of Patent: Aug. 23, 2011

(54) DISTRIBUTION STAR WITH ADAPTABLE GRIPPERS

(75) Inventors: Fabrizio Preti, Parma (IT); Massimiliano Barbieri, Parma (IT)

(73) Assignee: Sidel Holdings & Technology S.A., Pully (CH)

( * ) Notice: Subject to any disclaimer, the term of this patent is extended or adjusted under 35 U.S.C. 154(b) by 553 days.

(21) Appl. No.: 12/179,677

(22) Filed: Jul. 25, 2008

(65) Prior Publication Data
US 2009/0057099 A1 Mar. 5, 2009

(30) Foreign Application Priority Data
Aug. 1, 2007 (EP) .................................. 07113645

(51) Int. Cl.
  *B65G 37/00* (2006.01)
  *B65G 29/00* (2006.01)
  *B65G 47/00* (2006.01)
(52) U.S. Cl. ............... 198/459.2; 198/478.1; 198/469.1; 198/470.1
(58) Field of Classification Search ............... 198/478.1, 198/469.1, 470.1
See application file for complete search history.

(56) References Cited

U.S. PATENT DOCUMENTS
4,124,112 A * 11/1978 Mohney et al. ............... 198/394

FOREIGN PATENT DOCUMENTS
| DE | 29602798 | 10/1996 |
|---|---|---|
| DE | 19903319 | 8/1999 |
| EP | 0366225 | 5/1990 |
| JP | 2001233448 | 8/2001 |
| WO | 99/51514 | 10/1999 |
| WO | WO 9951514 A1 * | 10/1999 |

* cited by examiner

Primary Examiner — Gene Crawford
Assistant Examiner — Yolanda Cumbess
(74) Attorney, Agent, or Firm — Shoemaker and Mattare

(57) ABSTRACT

The present invention relates to a distribution star for containers of the type used in systems for manipulating containers (particularly bottles), for example in filling plants.
More particularly, the present invention relates to a distribution star of the type used in systems for manipulating containers, comprising a ring structure characterised in that it comprises:
  an annular fixed element that carries a plurality of grippers;
  an annular displacing element that carries cam means for the grippers;
  wherein the said annular displacing element is displaceable along a circumference of the said ring structure to set the said annular displacing element at different positions of the cam means with respect to the said grippers.

19 Claims, 4 Drawing Sheets

DISTRIBUTION STAR WITH ADAPTABLE GRIPPERS

FIELD OF THE INVENTION

The present invention relates to a distribution star for containers of the type used in systems for manipulating containers (particularly bottles), for example in filling machines.

BACKGROUND ART

Both linear and rotary filling machines are known to comprise a plurality of serially arranged operating units for the bottles to be moved therethrough. Plastic containers like PET bottles, particularly, are moved by being hooked at the neck by means of suitable grippers that are usually made of steel or resistant plastic. These grippers are controlled by suitable cams, which provide to close them around a bottle neck in the gripping stations, and then hold the same in this condition throughout the pathway to the release station.

However, in a filling machine, several bottle sizes can be usually processed. For each bottle size a different neck can be provided, so that the same gripper is not suitable for all the bottle types. In particular, the different diameters of the bottle necks in the various types needs that the jaws of the grippers be adapted for each diameter. This requires that the distribution star on which the grippers are mounted be disassembled and substituted with another star wherein the grippers suitable for the new diameter are mounted. This operation is lengthy and difficult, so that a relatively long stop of the plant is needed.

SUMMARY OF THE INVENTION

The problem at the heart of the present invention is thus to provide a distribution star for containers which does not require long and difficult operations for adapting it to different bottle necks diameters and avoids unacceptably long stop of the packaging process.

This problem is solved by a distribution star for systems for manipulating containers such as outlined in the annexed claims, whose wording is integral part of the present description.

Further features and advantages of the present invention will be better understood from the description of a preferred embodiment, which is given below by way of a non-limiting illustration.

DETAILED DESCRIPTION OF THE INVENTION

Figure 1:
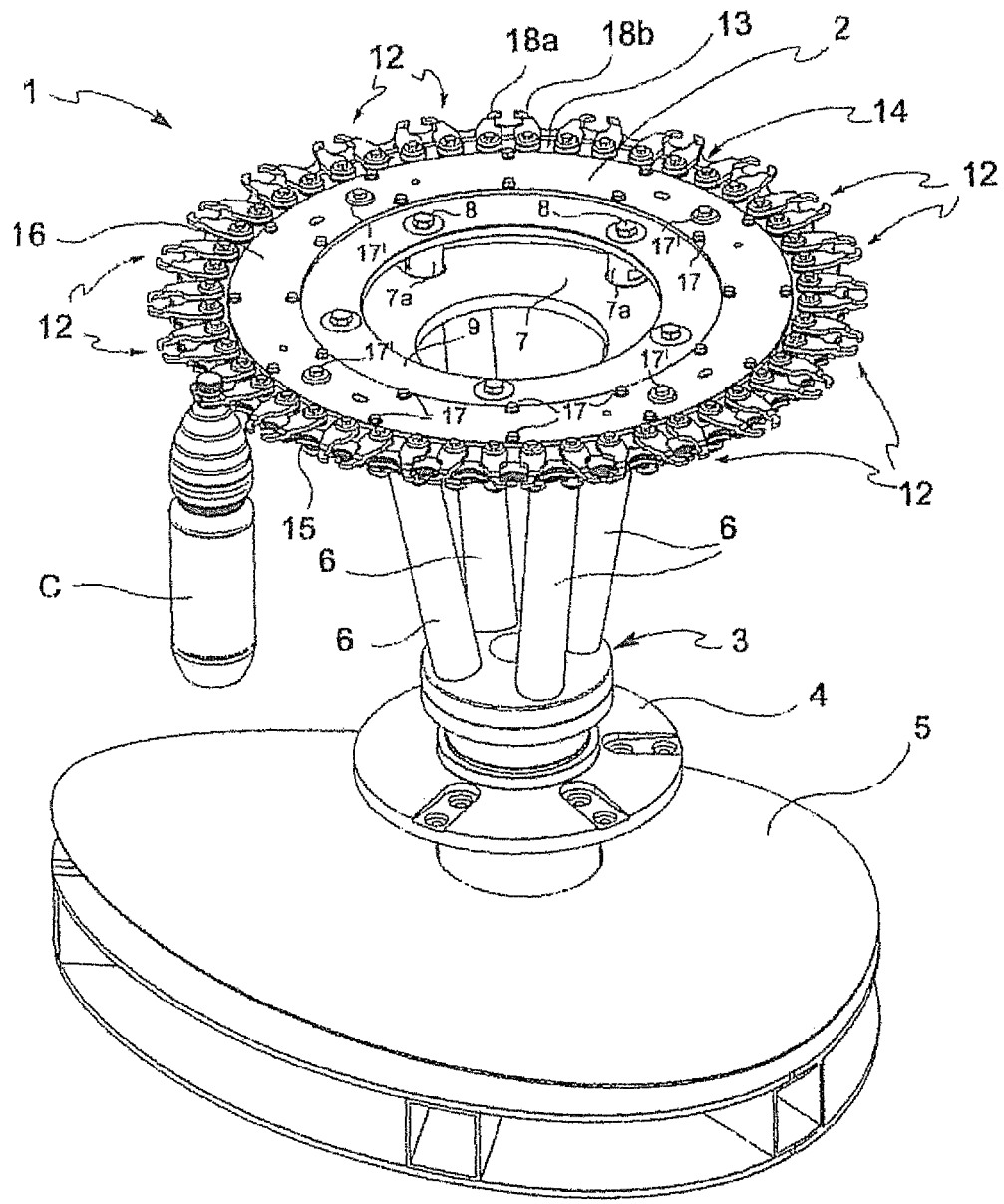
FIG. 1 is a perspective view of the inventive distribution star engaging the necks of bottles.

In the following specification, the terms "container" or "bottle" will be considered as synonymous.

With reference to the figures, the distribution star being the object of the present invention, which is generally designated with the numeral 1, comprises a ring structure 2 that is mounted on a rotatable support 3. The rotatable support 3 has a base 4 rotatably installed on a pedestal 5 and a plurality of legs 6 protruding upwards and diverging to connect with an annular plate 7. The annular plate 7 carries distancing means 7a that are fixed to the ring structure 2 by means of fixing means 8 such as screws or others.

The ring structure 2 comprises four coaxial ring elements.

The most internal ring element is an annular support element 9 that is joined to the distancing means 7a by means of fixing means 8 such as screws or others as explained above.

A first median ring element is an annular displacing element 10 carrying the cam means 11 for the grippers 12.

A second median ring element is an annular fixed element 13 that carries the grippers 12.

The concentrically external ring element is an annular adjustable element 14 carrying notches 15 for receiving the bottle necks, as explained below.

A top annular joining plate 16 bridges the annular support element 9, displacing element 10 and fixed element 13 and is removably fixed thereon by suitable fixing means 17, 17' such as screws, even if other conventional fixing means may be suitable as well. When screws are used, the fixing means 17' connecting the annular joining plate 16 with the annular displacing element 10 are preferably made of a screw-bolt assembly and pass through slots that are made in the annular displacing element 10, in order to allow its displacement by rotation around the star axis once the screws have been loosened.

The annular displacing element 10 and the annular fixed element 13 comprise the gripper assembly, wherein the grippers 12 and the gripper mechanism are carried by the annular fixed element 13, while the cam means 11 for actuating the grippers 12 are sustained by the annular displacing element 10.

The grippers 12 comprise each first 18a and second 18b jaws.

Both the cam means 11 and the jaws 18a, 18b are pivotally hinged to the annular displacing element 10 and to the annular fixed element 13, respectively, by means of suitable hinge means 19, 19', 19". The grippers 12 are positioned on the top side of the annular fixed element 13, while the corresponding mechanism is set on the other side of this annular fixed element 13. The cam means 11 are also set at the lower side of the corresponding annular displacing element 10 in order to interfere with the grippers mechanism, as will be described below.

The cam means 11 are of a conventional type, such as a disk cam 20 comprising a first reactive profile 20a intended to interact with the driven organ of the gripper and a second reactive profile 20b intended to interact with suitable guide means (not shown) arranged in a preset fixed position on the equipment, such as to control the opening and closure of the gripper 12 where desired.

The second jaw 18b, hereinafter referred to as the guided jaw 18b, is a rocker arm driven organ for the cam means 11. The guided jaw 18b comprises a body 21 that is hinged to said annular fixed element 13 via the hinge means 19' described above, a guide finger 22, a shaft 23 joining the body 21 and the guide finger 22, so that they move integrally, and a hook 24.

The guide finger 22 is intended to interact with the cam means 11 and, in all the operating steps of the gripper 12, it remains in contact with the first reactive profile 20a of the cam.

The hook 24 is intended to interact with the neck A of a container C, above the projecting collar B of the container C.

Spring means 25 are hinged to the guide finger 22, on the portion proximate to the shaft 23, by means of hinge means 26a. At the opposite end, the spring means 25 are directly hinged to the annular displacing element 10 by hinge means 26b. These spring means 25 are preloaded such that they tend to recall the guided jaw 18b in an open condition. The closure of the gripper 12 will thus take place against the resistance of the spring means 25 by the action of the cam means 11 on the guide finger 22.

The guide finger 22 further comprises actuating means 27, such as an actuating tooth, projecting in the direction substantially perpendicular to the axis of the guided jaw 18b. Such actuating means 27, in cooperation with the first jaw 18a, are provided to open/close the gripper 12.

The first jaw 18a, which is pivotally hinged to the hinge means 19, as said above, has a body 28 and a hook 29 that is entirely similar to the hook 24 of the guided jaw 18b.

The first jaw 18a further comprises receiving means 30 for the actuating means 27 of the guided jaw 18b. These receiving means 30 are joined to the body 28 of the first jaw 18a through a shaft (not visible) in order to rotate integrally. The receiving means 30 comprise a pair of teeth 31, 31' which are separated by a gap that forms a seat for the actuating means 27 (actuating tooth) of the guided jaw 18b.

The annular joining plate 16 have a plurality of slots 32 put in alignment with a through hole 32' in the annular displacing element 10 and positioned in a substantially perpendicular relationship with respect to a radius of the distribution star 1.

Figure 2:
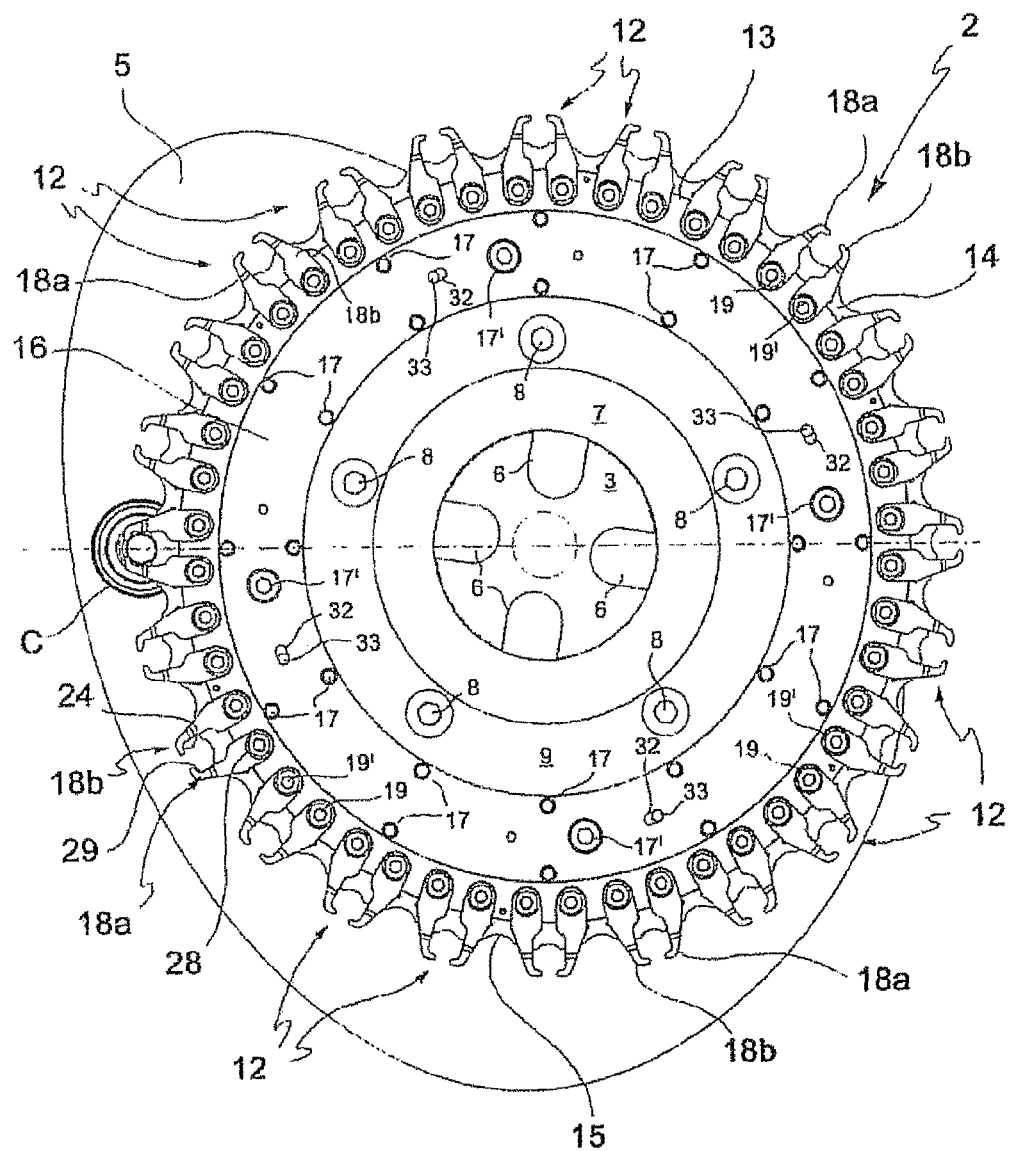
FIG. 2 is a top plan view of the star in FIG. 1.

A pin 33 is inserted in the slots 32 and in the corresponding through hole 32' and provides for the radial balancing of the annular displacing element 10 with respect to the support element 9 and the annular fixed element 13. At least three slots 32 and pins 33 are necessary to allow a correct positioning of the annular displacing element 10, but more than three can also be used, as shown in FIG. 2.

The annular adjustable element 14, as said above, carries the notches 15. The said notches 15 have an arcuate profile, the amplitude of which depends on the bottle size, i.e. larger bottle necks require a notch 15 of greater amplitude. Notches 15 of different amplitude are set in sequence along the perimeter of the said annular adjustable element 14 for the various bottle neck size normally used.

Figure 4:
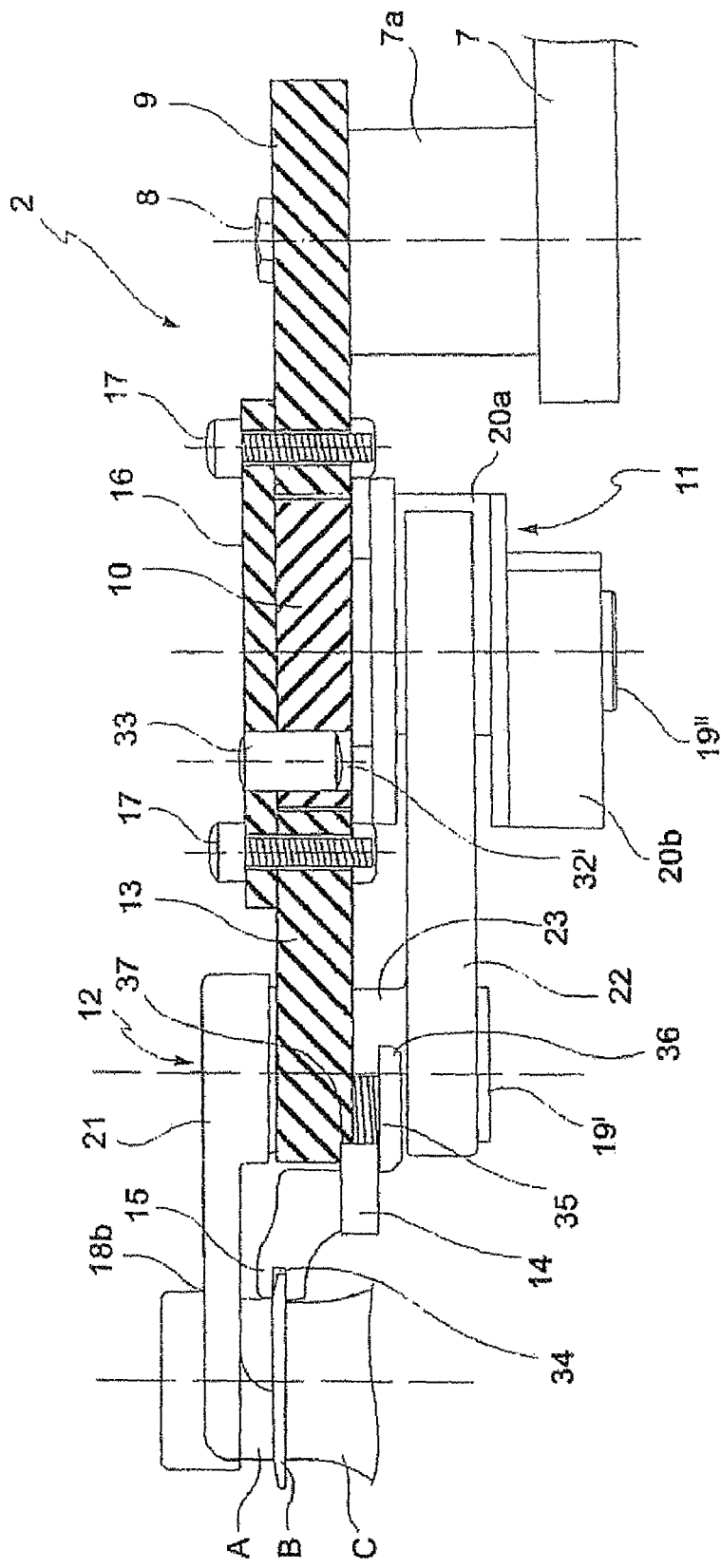
FIG. 4 is a sectional view according to the section IV-IV in FIG. 3.

In transversal section (see FIG. 4), the notches 15 show a slit profile 34 shaped to accommodate the projecting collar B of the bottle neck. This improves the engagement of the bottle by the grippers 12.

Suitable loosening fixing means 35, such as screw means, are provided to set the annular adjustable element 14 in a wanted positioned. As shown, the head 36 of the screw is sufficiently large to engage the lower side of the annular adjustable element 14, which thus is pressed between the said head 36 and the lower side of the annular fixed element 13. To allow centring of the annular adjustable element 14, the annular fixed element 13 has a stepped profile 37 on which the said annular adjustable element 14 abuts. The stepped profile 37 acts as radial stopping means for the annular adjustable element 14.

Once the loosening fixing means 35 are loosened, the annular adjustable element 14 can be disengaged and then rotated to position correctly the suitable notch 15 in alignment with the gripper 12.

The operation of the inventive distribution star 1 will be now described.

Figure 3:
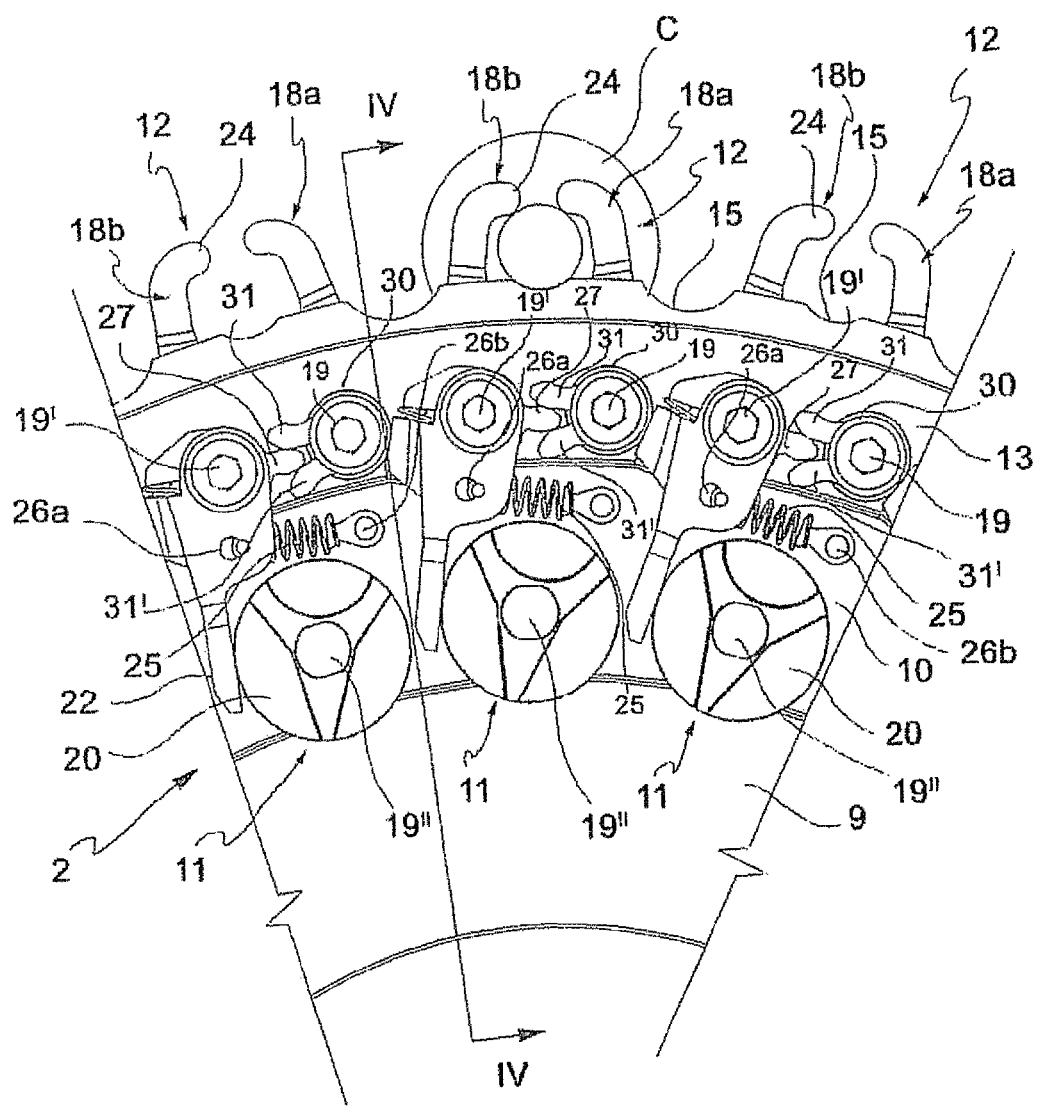
FIG. 3 is a bottom plan view of a particular of the star in FIG. 1.

Upon a non operating condition, the grippers 12 are in a rest condition, with the jaws 18a, 18b being opened. When the first reactive profile 20a of the cam means 11 acts on the guide finger 22, the guided jaw 18b is driven to rotate clockwise against the resistance of the spring means 25. The actuating means 27 will thus act against the walls of the teeth 31, 31' of the second jaw 18a, thus causing a counter-clockwise rotation of the same about the hinge means 19. The rotation of the two jaws 18a, 18b causes the same to be closed around the neck of a container C, as shown in FIG. 2 or 3.

Upon the subsequent opening of the gripper 12, i.e. when the first reactive profile 20a of the cam means 11 moves back to the rest position, the actuating means 27 will move again integrally with the guided jaw 18b.

When a different diameter of neck bottle is to be managed in the distribution star 1, the ring structure 2 can easily be adapted as described below.

The fixing means 17' are loosened, in order to allow rotation of the annular displacing element 10 around the axis of the distribution star 1. The rotation of the annular displacing element 10 can be facilitated by operating on the pins 33 and allowing them to move in the slots 32. In such a way, the cam means 11 are displaced along a circumference of the distribution star. This causes the guide finger 22, which is drawn by the preloaded spring means 25, to also adapt against the first reactive profile 20a of the cam means 11 in a new rest position. As a consequence, the guided jaw 18b slightly rotates and, through the actuating means 27, also causes the first jaw 18a to rotate at the same extent, so that both the jaws close or open to adapt to a different diameter of the neck of the bottle C.

Suitable adjustment marks, such as nicks or labels, can indicate, in connection with the different positions of the pins 33, the diameter of the bottles to be treated, in order to facilitate the correct adjustment of the system.

The annular adjustable element 14 must also be adapted to the wanted diameter of bottle neck. This can be achieved by loosening the fixing means 35 (such as screw means) that set the annular adjustable element 14 in a fixed position and rotating it to allow the correct notches 15 to be positioned in alignment with the grippers 12, as described above. Then the fixing means are again tightened to set the annular adjustable element 14 in the new operating condition.

The advantages of the distribution star 1 according to the invention are thus apparent.

Thanks to the described gripper mechanism, the displacement around the star axis of the cam means allow to adjust the amplitude of the jaws 18a, 18b of the grippers to different diameters of bottles necks. The notches 15 can also be easily adapted by rotation of the annular adjustable element 14.

These adjustments can be made in an easy and fast way, without disassembling the distribution star 1. This allows to strongly reduce the stop time of the plant and to increase productivity.

In a preferred embodiment, the actuating means 27 are as described in FIG. 1 and pages 4-5 of European patent application no. 06425399.0 in the name of the same Applicant, whose corresponding disclosure is herein incorporated by reference. In summary, the actuating means 27 comprise a body that is not integral with the guided jaw 18b and that is, in turn, pivotally hinged to the hinge means 19', from which the actuating means 27 projects in the direction substantially perpendicular to the axis of the guided jaw 18b.

The body of the actuating means 27 is housed in a cavity having a substantially complementary shape which is purposely formed in the body of the guide finger 22, proximally to the shaft 23. Said body has a substantially circular plan section that is interrupted by a step forming a pawl, which abuts against an abutment surface of the body of the guide finger 22 and prevents the actuating means 27 from rotating clockwise, while counter-clockwise rotation is allowed. The body of the actuating means 27 further has a relief on which suitable spring means act upon. At the opposite end thereof, the said spring means act on a stop element being formed in the body of the guide finger 22 and are preloaded such as to hold the pawl pressed against the said abutment surface.

The actuating means 27 will integrally move with the guided jaw 18b, due to the fact that the spring means acting on the actuating means 27 are suitably preloaded and thus counteract the thrust reaction to which the actuating means 27 are subjected and which would tend to cause them to rotate counter-clockwise.

Upon the subsequent opening of the gripper 12, i.e. when the first reactive profile 20a of the cam means 11 moves back to the rest position, the actuating means 27 will move again integrally with the guided jaw 18b due to the pawl that prevents the actuating means 27 from rotating clockwise.

When an abnormal situation occurs, e.g. when a container C gets entangled in a fixed part of the machine, the neck of this container C acts as a lever on the first jaw 18a, which thus rotates clockwise, thereby the teeth 31, 31' act on the actuating means 27 such that it is forced to rotate counter-clockwise. As the actuating means 27 are free to rotate counter-clockwise against the resistance of the corresponding spring means, when the preload force of the said spring means is overcome, the gripper 12 opens as much as to allow the container C to be released without causing any damage to the gripper. On the contrary, when the actuating means 27 are integral with the guided jaw 18b as in the first embodiment described above, the gripper will be broken or at least damaged.

The fact that the gripper 12 is prevented from being damaged or broken by means of the inventive device not only means that the cost for spare parts has been decreased, but also and above all, that the number of interruptions of the plant operation for allowing the replacement of the damaged piece is dramatically reduced, which results in the optimization of the manufacturing cycle.

Thus, the combination of both the features of i) adjustment of the distribution star to different diameters of bottle necks and ii) imparting more elasticity to the gripper assembly to avoid accidental damage of the grippers 12, as provided in the second embodiment described above, is particularly helpful to optimize the productivity of the plant, lessen the human intervention and thus reduce the operating costs.

It will be appreciated that only a particular embodiment of the present invention has been described herein, to which those skilled in the art will be able to make any and all modifications necessary for its adjustment to specific applications, without however departing from the scope of protection of the present invention as defined in the annexed claims.

We claim:

1. A distribution star of the type used in systems for manipulating containers, comprising a ring structure and having:
    an annular fixed element that carries a plurality of grippers;
    an annular displacing element that carries cam means for the grippers;
    wherein the annular displacing element is displaceable along a circumference of the ring structure to set the annular displacing element at different positions of the cam means with respect to the grippers, wherein the cam means are positioned at the lower side of the annular displacing element in a position such as to interfere with the gripper mechanism,
    said cam means comprising a disk cam that comprises a first reactive profile intended to interact with the driven organ of the gripper and a second reactive profile intended to interact with guide means arranged in a preset fixed position on the system for manipulating containers, such as to control the opening and closure of the gripper where desired.

2. The distribution star according to claim 1, wherein the ring structure further comprises an annular adjustable element that carries a plurality of notches for engaging a projecting collar of the neck of a container, the annular adjustable element being situated in a concentrically external position with respect to the annular fixed element.

3. The distribution star according to claim 2, wherein the notches have an arcuate profile, the amplitude of which depends on the bottle size, notches of different amplitude being set in sequence along the perimeter of the annular adjustable element.

4. The distribution star according to claim 2, wherein the annular fixed element has a stepped profile on which the annular adjustable element abuts.

5. The distribution star according to claim 1, wherein the ring structure further comprises an annular support element that is joined to a rotatable support for the distribution star, the annular support element being situated in a concentrically internal position with respect to the annular displacing element.

6. The distribution star according to claim 1, wherein the ring structure comprises an annular joining plate bridging the annular support element, displacing element and fixed element, the annular joining plate being removably fixed thereon by fixing means.

7. The distribution star according to claim 6, wherein the fixing means connecting the annular joining plate with the annular displacing element are a screwbolt assembly passing through slots that are made in the annular displacing element, in order to allow its displacement by rotation around the star axis once the screw-bolt assembly has been loosened.

8. The distribution star according to claim 7, wherein the annular joining plate has a plurality of slots put in alignment with a through hole in the annular displacing element and positioned in a substantially perpendicular relationship with respect to a radius of the distribution star, a pin being inserted in each slot and in a corresponding through hole.

9. A distribution star of the type used in systems for manipulating containers, comprising a ring structure and having:
    an annular fixed element that carries a plurality of grippers;
    an annular displacing element that carries cam means for the grippers;
    wherein the annular displacing element is displaceable along a circumference of the ring structure to set the annular displacing element at different positions of the cam means with respect to the grippers,
    wherein the ring structure further comprises
    an annular support element that is joined to a rotatable support for the distribution star, the annular support element being situated in a concentrically internal position with respect to the annular displacing element and
    an annular joining plate bridging the annular support element, displacing element and fixed element, the annular joining plate being removably fixed thereon by a screwbolt assembly passing through slots that are made in the annular displacing element, in order to allow its displacement by rotation around the star axis once the screw-bolt assembly has been loosened,
    wherein the annular joining plate has a plurality of slots put in alignment with a through hole in the annular displacing element and positioned in a substantially perpendicular relationship with respect to a radius of the distribution star, a pin being inserted in each slot and in a corresponding through hole,
    wherein at least three slots and pins are provided.

10. A distribution star of the type used in systems for manipulating containers, comprising a ring structure and having:
- an annular fixed element that carries a plurality of grippers;
- an annular displacing element that carries cam means for the grippers;
- wherein the annular displacing element is displaceable along a circumference of the ring structure to set the annular displacing element at different positions of the cam means with respect to the grippers,
- wherein the grippers comprise each first and second jaws, both the cam means and the jaws being pivotally hinged to the annular displacing element and to the annular fixed element, respectively, by means of hinge means, wherein the grippers are positioned on the top side of the annular fixed element, while a corresponding mechanism is set on the lower side of the annular fixed element, and
- wherein the second jaw of the gripper is a guided jaw being a rocker arm driven organ for the cam means, the guided jaw comprising a body, a guide finger at the lower side of the annular fixed element, a shaft integrally joining the body and the guide finger and a hook, the guide finger being intended to contact the first reactive profile of the cam means in all the operating steps of the gripper.

11. The distribution star according to claim 10, wherein spring means are hinged to the guide finger and to the annular displacing element, the spring means being preloaded such that they tend to recall the guided jaw in an open condition.

12. The distribution star according to claim 10, wherein the first jaw has a body and a hook and wherein the guide finger comprises actuating means projecting in the direction substantially perpendicular to the axis of the guided jaw, such actuating means acting on receiving means on the body of the first jaw.

13. The distribution star according to claim 12, wherein the receiving means comprise a pair of teeth which are separated by a gap that forms a seat for the actuating means of the guided jaw.

14. The distribution star according to claim 3, wherein the notches have in transverse section a slit profile shaped to accommodate the projecting collar of a bottle neck.

15. The distribution star according to claim 3, wherein loosening fixing means are provided to allow rotation of the annular adjustable element when necessary and to set it in a wanted positioned.

16. The distribution star according to claim 15, wherein the loosening fixing means are screw means, the head of the screw means being sufficiently large to engage the lower side of the annular adjustable element and to press it between the said head and the lower side of the annular fixed element.

17. A distribution star of the type used in systems for manipulating containers, comprising a ring structure and having:
- an annular fixed element that carries a plurality of grippers;
- an annular displacing element that carries cam means for the grippers;
- wherein the annular displacing element is displaceable along a circumference of the ring structure to set the annular displacing element at different positions of the cam means with respect to the grippers,
- wherein the grippers comprise each first and second jaws, both the cam means and the jaws being pivotally hinged to the annular displacing element and to the annular fixed element, respectively, by means of hinge means, wherein the grippers are positioned on the top side of the annular fixed element, while a corresponding mechanism is set on the lower side of the annular fixed element,
- the said first jaw has a body and a hook and the guide finger comprises actuating means projecting in the direction substantially perpendicular to the axis of the guided jaw, such actuating means acting on receiving means on the body of the said first jaw and
- the actuating means is housed in a cavity having a substantially complementary shape, which is formed in the body of said guide finger, said body comprising a pawl intended to abut against an abutment surface of said guided jaw for preventing the rotation of said actuating means in a rotational direction, while allowing the same to rotate in the opposite direction.

18. The distribution star according to claim 17, wherein said actuating means comprise a relief and spring means acting on said relief and on a stop element being associated with said guide finger.

19. The distribution star according to claim 18, wherein said spring means are preloaded such that the pawl is hold pressed against the abutment surface.

* * * * *